United States Patent
Myers et al.

(10) Patent No.: US 10,232,846 B2
(45) Date of Patent: Mar. 19, 2019

(54) RIDE CONTROL SYSTEMS AND METHODS

(71) Applicant: Ford Global Technologies, LLC, Dearborn, MI (US)

(72) Inventors: Scott Vincent Myers, Camarillo, CA (US); Mohamed Ahmad, East Palo Alto, CA (US); Jinesh J Jain, Palo Alto, CA (US); Lisa Scaria, Milpitas, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 32 days.

(21) Appl. No.: 15/409,265

(22) Filed: Jan. 18, 2017

(65) Prior Publication Data

US 2018/0201254 A1  Jul. 19, 2018

(51) Int. Cl.
| | | |
|---|---|---|
| *B60W 30/02* | (2012.01) | |
| *B60W 10/22* | (2006.01) | |
| *B60W 10/30* | (2006.01) | |
| *B60W 50/14* | (2012.01) | |
| *B60G 17/017* | (2006.01) | |
| *G05D 1/00* | (2006.01) | |
| *G05D 1/02* | (2006.01) | |
| *B60G 17/016* | (2006.01) | |

(52) U.S. Cl.
CPC ......... *B60W 30/025* (2013.01); *B60G 17/016* (2013.01); *B60G 17/017* (2013.01); *B60W 10/22* (2013.01); *B60W 10/30* (2013.01); *B60W 50/14* (2013.01); *G05D 1/0088* (2013.01); *G05D 1/0212* (2013.01); *B60G 2401/142* (2013.01); *B60G 2401/16* (2013.01); *B60G 2800/01* (2013.01); *B60G 2800/16* (2013.01); *B60W 2420/42* (2013.01); *B60W 2420/52* (2013.01); *B60W 2420/54* (2013.01); *B60W 2550/14* (2013.01); *B60W 2710/22* (2013.01)

(58) Field of Classification Search
CPC .... B60W 30/025; B60W 10/22; B60W 10/30; B60W 50/14; B60W 30/25; B60G 17/017; G05D 1/0088; G05D 1/0212
USPC ......................................................... 701/25
See application file for complete search history.

(56) References Cited

U.S. PATENT DOCUMENTS

| | | | |
|---|---|---|---|
| 7,490,684 | B2 | 2/2009 | Seymour |
| 8,939,455 | B1 | 1/2015 | Terry |
| 9,463,805 | B2 | 10/2016 | Kirsch |
| 9,500,489 | B1 | 11/2016 | Ng |
| 2007/0279206 | A1 | 12/2007 | Singfield |
| 2011/0010024 | A1 | 1/2011 | Salisbury |
| 2014/0144346 | A1 | 5/2014 | Houston |
| 2015/0144411 | A1 | 5/2015 | Washington |

(Continued)

FOREIGN PATENT DOCUMENTS

JP       2017110990 A    6/2017

*Primary Examiner* — Yazan A Soofi
(74) *Attorney, Agent, or Firm* — David R. Stevens; Stevens Law Group

(57) ABSTRACT

Example ride control systems and methods are described. In one implementation, a method receives a request to initiate a drive session to help a baby fall asleep in a vehicle. The method identifies a driving route for the drive session and implements the drive session by following the driving route. One or more vehicle-mounted sensors determine whether the baby in the vehicle has fallen asleep during the drive session.

18 Claims, 7 Drawing Sheets

(56) References Cited

U.S. PATENT DOCUMENTS

2016/0176409 A1* 6/2016 Kirsch .................. B60W 40/08
                                                    701/37
2017/0129298 A1* 5/2017 Lu ........................ B60G 17/015
2017/0136842 A1* 5/2017 Anderson ............ B60G 17/016

* cited by examiner

//RIDE CONTROL SYSTEMS AND METHODS

TECHNICAL FIELD

The present disclosure relates to vehicular systems and, more particularly, to systems and methods that help put a baby to sleep.

BACKGROUND

Oftentimes, parents take their baby for a ride in a car to help the baby fall asleep. The gentle rocking motion provided by the vehicle along with road noise creates an environment that can help put a baby to sleep. Sometimes, a parent may need some help in determining which driving route to take. It would also be helpful to tell a parent driving the vehicle, especially if the parent is alone, that the baby has fallen asleep so that the parent can end the drive session and head for home.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
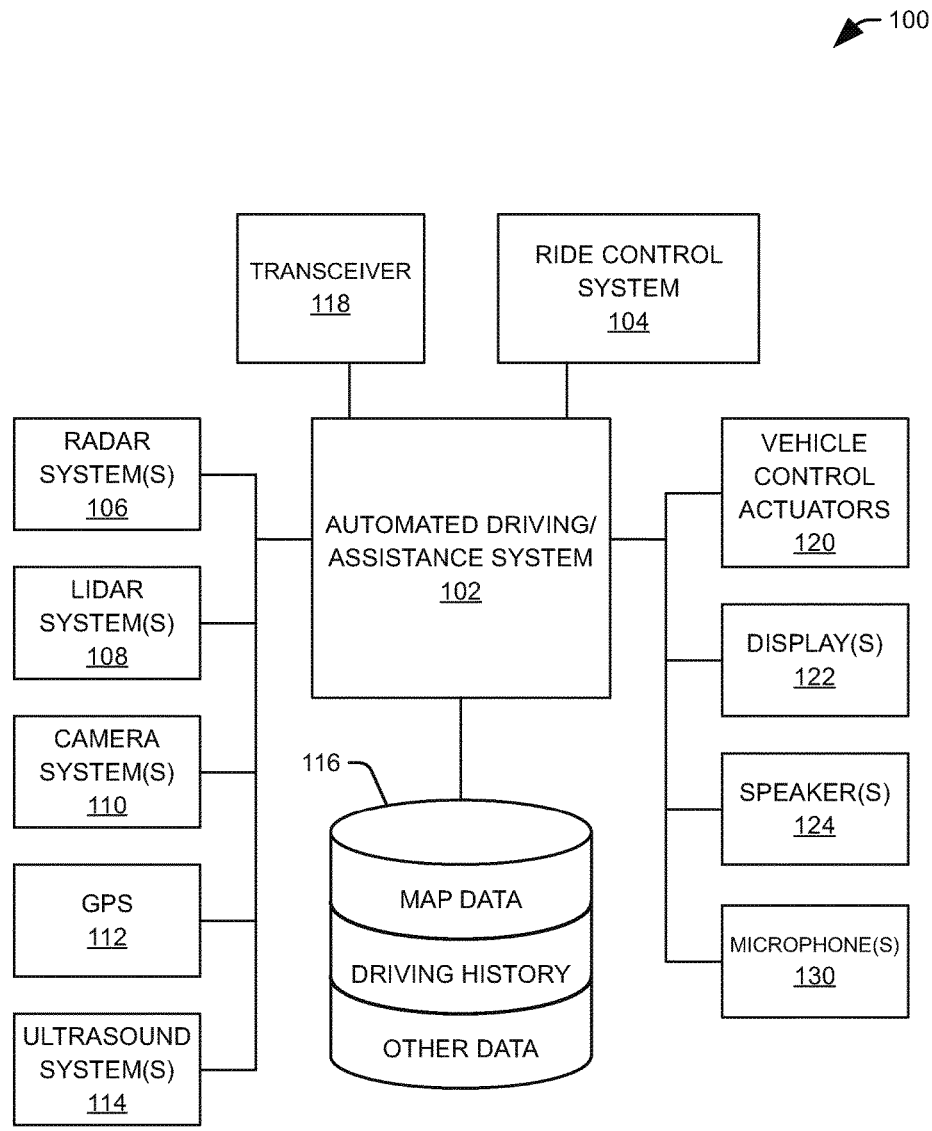
FIG. 1 is a block diagram illustrating an embodiment of a vehicle control system that includes a ride control system.

In the following disclosure, reference is made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter is described in language specific to structural features and/or methodological acts, it is to be understood that the subject matter defined in the appended claims is not necessarily limited to the described features or acts described herein. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed herein may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure are directed to computer program products comprising such logic (e.g., in the form of software) stored on any computer useable medium. Such software, when executed in one or more data processing devices, causes a device to operate as described herein.

FIG. 1 is a block diagram illustrating an embodiment of a vehicle control system 100 that includes a ride control system 104. An automated driving/assistance system 102 may be used to automate or control operation of a vehicle or to provide assistance to a human driver. For example, the automated driving/assistance system 102 may control one or more of braking, steering, seat belt tension, acceleration, lights, alerts, driver notifications, radio, vehicle locks, or any other auxiliary systems of the vehicle. In another example, the automated driving/assistance system 102 may not be able to provide any control of the driving (e.g., steering, acceleration, or braking), but may provide notifications and alerts to assist a human driver in driving safely. Vehicle control system 100 includes a ride control system 104 that interacts with various components in the vehicle control system 100 to initiate and implement a drive session to help a baby in the vehicle fall asleep. In some embodiments, ride control system 104 may simulate rather than implement a drive session, as discussed subsequently. Although ride control system 104 is shown as a separate component in FIG. 1, in alternate embodiments, ride control system 104 may be incorporated into automated driving/assistance system 102 or any other vehicle component.

The vehicle control system 100 also includes one or more sensor systems/devices for detecting a presence of nearby objects or determining a location of a parent vehicle (e.g., a vehicle that includes the vehicle control system 100). For example, the vehicle control system 100 may include radar (Radio Detection And Ranging) systems 106, one or more Lidar (Light Detection And Ranging) systems 108, one or more camera systems 110, a global positioning system (GPS) 112, and/or ultrasound systems 114. The one or more camera systems 110 may include a rear-facing camera mounted to the vehicle (e.g., a rear portion of the vehicle), a front-facing camera, and a side-facing camera. Camera systems 110 may also include one or more interior cameras that capture images of passengers and other objects inside the vehicle.

Additionally, the vehicle control system 100 may include a data store 116 for storing relevant or useful data for navigation and safety, such as map data, driving history, or other data. The driving history, for example, may be used by ride control system 104 to implement a drive session. The driving history may also include information regarding one or more driving routes that helped a baby in the vehicle fall asleep. In some embodiments, the information regarding the one or more driving routes may also include road profiles, road topologies, the number of stops associated with a driving route, the number of turns associated with a driving route, and so on. The vehicle control system 100 may also include a transceiver 118 for wireless communication with a mobile or wireless network, other vehicles, infrastructure, or any other communication system.

The vehicle control system 100 may include vehicle control actuators 120 to control various aspects of the driving of the vehicle such as electric motors, switches or other actuators, to control braking, acceleration, steering, seat belt tension, door locks, or the like. In some embodiments, vehicle control actuators 120 also include or control one or more vehicle suspension controllers, as discussed herein. The vehicle control system 100 may also include one or more displays 122, speakers 124, microphones 130, or other devices so that notifications to a human driver or passenger may be provided. A display 122 may include a heads-up display, dashboard display or indicator, a display screen, or any other visual indicator, which may be seen by a driver or passenger of a vehicle. The speakers 124 may include one or more speakers of a sound system of a vehicle or may include a speaker dedicated to driver or passenger notification. Microphones 130 may be included to capture audio signals of the environment around the vehicle to detect, for example, sounds associated with people, animals, emergency vehicles (sirens) and so on around the vehicle.

It will be appreciated that the embodiment of FIG. 1 is given by way of example only. Other embodiments may include fewer or additional components without departing from the scope of the disclosure. Additionally, illustrated components may be combined or included within other components without limitation.

In one embodiment, the automated driving/assistance system 102 is configured to control driving or navigation of a parent vehicle. For example, the automated driving/assistance system 102 may control the vehicle control actuators 120 to drive a path on a road, parking lot, driveway or other location. For example, the automated driving/assistance system 102 may determine a path based on information or perception data provided by any of the components 106-118. A path may also be determined based on previous routes that caused a baby to fall asleep in the vehicle. The sensor systems/devices 106-110 and 114 may be used to obtain real-time sensor data so that the automated driving/assistance system 102 can assist a driver or drive a vehicle in real-time.

Figure 2:
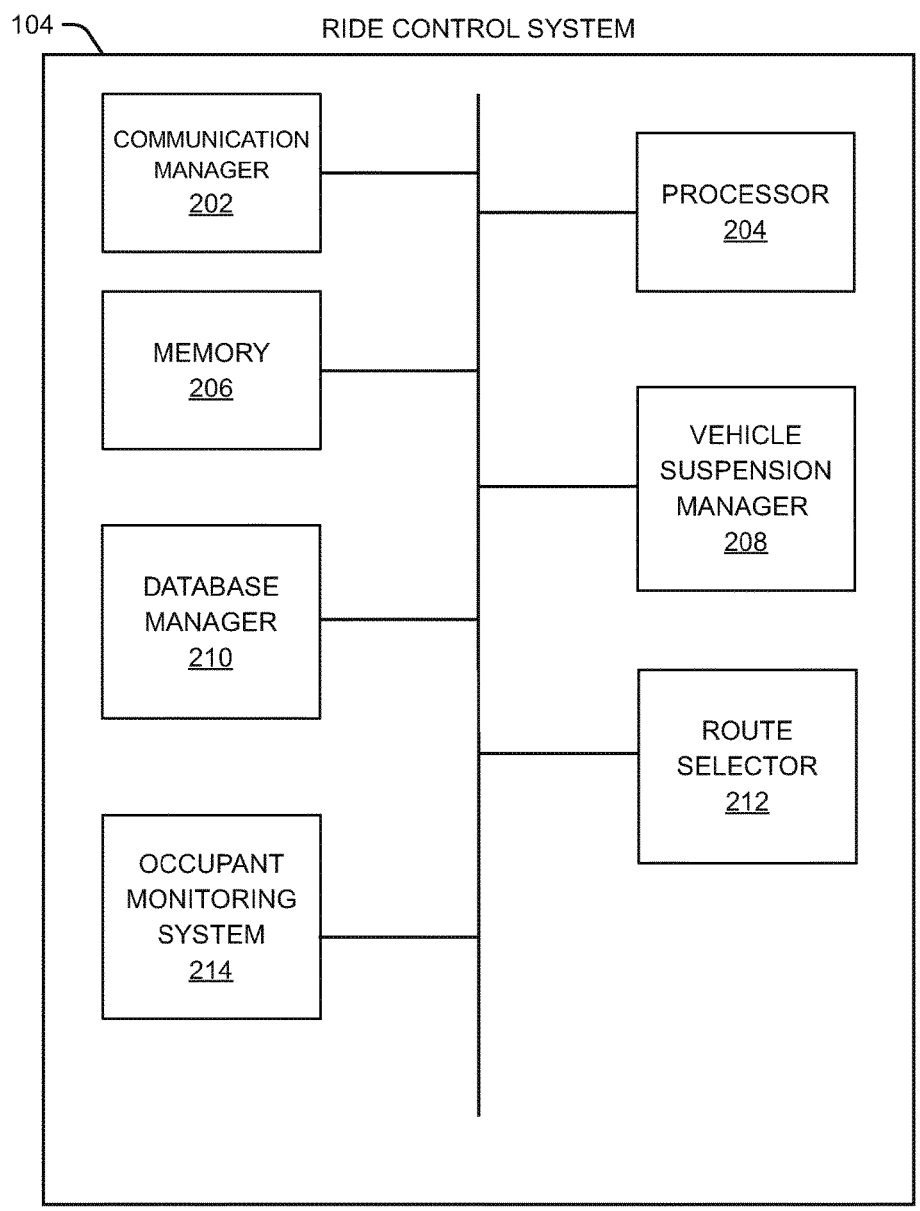
FIG. 2 is a block diagram illustrating an embodiment of a ride control system.

FIG. 2 is a block diagram illustrating an embodiment of ride control system 104. As shown in FIG. 2, ride control system 104 includes a communication manager 202, a processor 204, and a memory 206. Communication manager 202 allows ride control system 104 to communicate with other systems, such as automated driving/assistance system 102 and data store 116. Processor 204 executes various instructions to implement the functionality provided by ride control system 104 as discussed herein. Memory 206 stores these instructions as well as other data used by processor 204 and other modules and components contained in ride control system 104.

Ride control system 104 also includes a vehicle suspension manager 208, where vehicle suspension manager 208 is configured to manage system components (discussed subsequently) that generate independent motion in the suspension of the vehicle. As discussed herein, vehicle suspension manager 208 may manage the control of one or more vehicle suspension components to simulate vehicle movements during a drive.

A database manager 210 included in ride control system 104 is configured to communicate with data store 116 via, for example, communication manager 202. Database manager 210 is associated with managing data from data store 116, where the data includes past driving history, road topologies, and other road/route information to help determine a driving route used to implement or simulate a drive session. Ride control system 104 may also include a route selector 212 that is configured to determine a route to implement or simulate a drive session as described subsequently. To help determine whether a baby in the car has fallen asleep, ride control system 104 may also include an occupant monitoring system 214. In some embodiments, occupant monitoring system 214 may receive data from one or more camera systems 110 configured to monitor a baby in the vehicle and determine whether the baby has fallen asleep.

Figure 3:
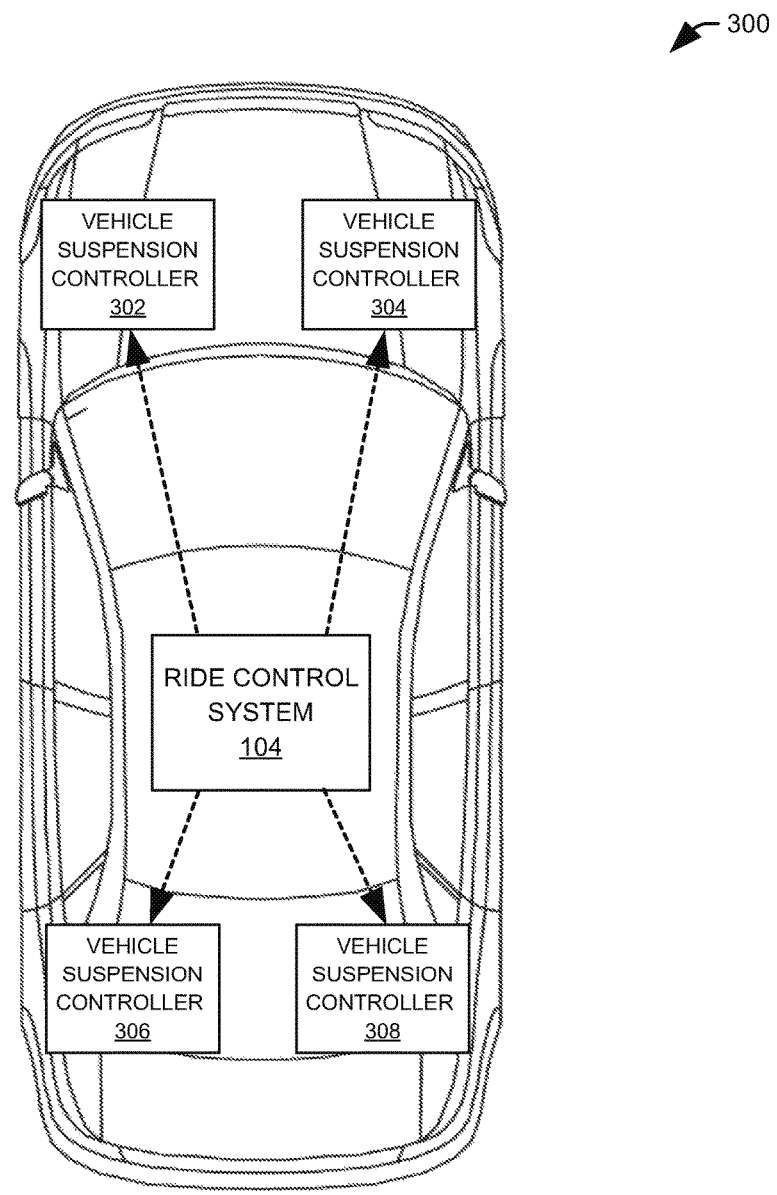
FIG. 3 illustrates an embodiment of a ride control system on a vehicle along with associated vehicle suspension controllers.

FIG. 3 illustrates an embodiment of ride control system 104 implemented in a vehicle 300 along with associated vehicle suspension controllers. In some embodiments, vehicle 300 may be a 4-wheel vehicle, and may have a vehicle suspension controller 302, a vehicle suspension controller 304, a vehicle suspension controller 306 and a vehicle suspension controller 308 respectively controlling the suspension associated with each wheel of the vehicle. In some embodiments, each of vehicle suspension controller 302, vehicle suspension controller 304, vehicle suspension controller 306 and vehicle suspension controller 308 may independently control a height-adjustable shock absorber. Other embodiments may include suspension control systems that may include one or more of a hydraulically actuated suspension control system using hydraulic servomechanisms, an electromagnetic suspension control system using electromagnetic motors coupled to each wheel of the vehicle, a magnetorheological suspension control system using magnetic suspension damper fluid controlled by an electromagnet, and so on. Suspension components such as active shock absorbers may also be implemented. One or more implementations of these suspension control methods may allow the independent control of vehicle suspension. For example, the damping of the suspension associated with each wheel may be controlled independently, or each suspension component can be extended or contracted independently of other suspension components, allowing the area of the vehicle associated with each wheel (for example, each corner of the vehicle) to be raised or lowered independently of the other areas of the vehicle. In some embodiments, the independent control of vehicle suspension may include a pneumatically adjustable suspension system.

In some embodiments, each vehicle suspension controller 302-308 may be controlled or managed by vehicle suspension manager 208. Each vehicle suspension controller 302-308 is controlled independently by ride control system 104, to generate independent motion in the corresponding suspension part of the vehicle as shown in FIG. 3. For example, the vehicle suspension can be raised or lowered by respectively extending or contracting the associated suspension components. The front of the vehicle can be raised or lowered by ride control system 104 commanding vehicle suspension controller 302 and vehicle suspension controller 304 to simultaneously extend or contract the corresponding suspension components, associated with the front wheels, respectively. Similarly, the rear of the vehicle can be raised or lowered by ride control system 104 commanding vehicle suspension controller 306 and vehicle suspension controller 308 to simultaneously extend or contract the corresponding suspension components, associated with the rear wheels, respectively. As an example, this control scheme can be used to simulate the vehicle traversing a speedbump in the road, where initially the front suspension components are extended and then lowered back to their initial position at a specified rate, and then the rear suspension components are raised and then lowered back to their initial position at a specified rate.

As another example, vehicle suspension controller 302 and vehicle suspension controller 306 can be commanded by ride control system 104 to simultaneously extend the corresponding suspension components, while vehicle suspension controller 304 and vehicle suspension controller 308 can be commanded by ride control system 104 to simultaneously contract the corresponding suspension components. In this way, left side of the vehicle can be raised and the right side of the vehicle can be lowered, and this can be used to simulate the vehicle traveling on a banked curve in the road, where the curve in the road is toward the left. Similarly, a vehicle path over a rough or uneven road surface may be simulated by ride control system 104 generating independent, possibly random, vibrational motion in each suspension component via suspension controller 302-308. Conversely, a simulation of a smooth road surface would generate little to no such independent random motion in the suspension components. By an extension of the discussion above, vehicle acceleration, deceleration and stopping can also be simulated by appropriately varying the suspension extension amounts, as accomplished by ride control system 104. The generation of independent motion in the vehicle suspension is used to simulate a drive session as discussed subsequently.

Figure 4:
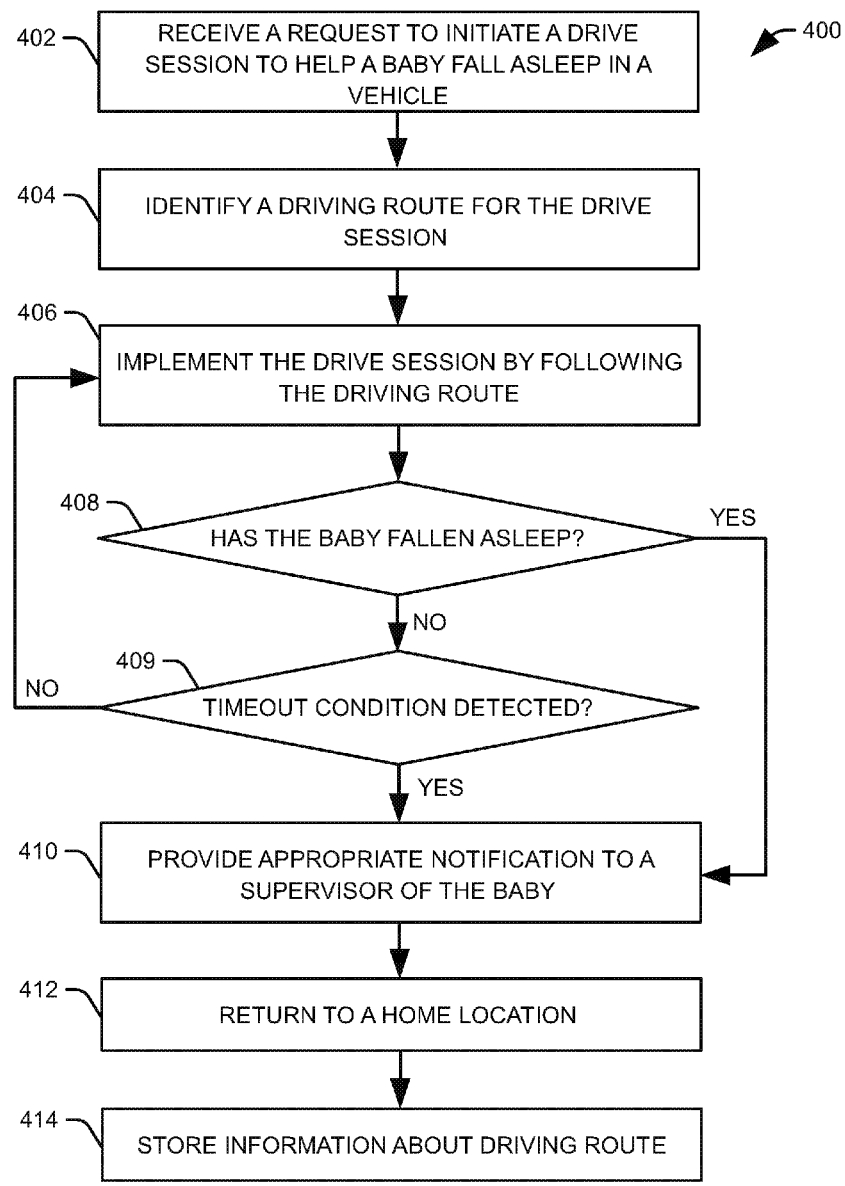
FIG. 4 illustrates an embodiment of a method for implementing a drive session to help a baby in the vehicle fall asleep.

FIG. 4 illustrates an embodiment of a method 400 for implementing a drive session to help a baby in the vehicle fall asleep. In some embodiments, method 400 may be implemented, at least in part, by ride control system 104. At 402, the method receives a request to initiate a drive session to help a baby fall asleep in a vehicle. In some embodiments, this request may be received from a parent or supervisor of the baby. At 404, the method identifies a driving route for the drive session. Additional details regarding identifying a driving route are discussed herein, such as with respect to FIG. 5. Next at 406, the method implements the drive session by following the driving route, where the baby may be placed in a standard infant or toddler seat in the vehicle. In some embodiments, the parent or supervisor of the baby may drive the vehicle during the drive session. In other embodiments, the vehicle may be an autonomously-driven vehicle, and the parent or supervisor of the baby may be present in the vehicle during the drive session.

At 408 the method checks to determine whether the baby has fallen asleep. In some embodiments, the task of determining whether the baby has fallen asleep is performed by occupant monitoring system 214, where occupant monitoring system 214 may receive data (e.g., images) from one or more camera systems 110. In some embodiments, occupant monitoring system 214 may determine that the baby has fallen asleep based on image processing functions that determine whether the baby's eyes are closed, or whether the baby has assumed a particular body posture. In some embodiments, occupant monitoring system 214 may determine, using image processing techniques, the baby's heart rate and the baby's breathing rate. When the baby's heart rate or the baby's breathing rate falls below a certain threshold, the method may declare that the baby has fallen asleep. In other embodiments, occupant monitoring system 214 may determine, using image processing techniques, any movement associated with the baby. A decrease in the baby's movement for a period of time that is greater than a certain preset threshold (for example, 3 minutes) may trigger the method to declare that the baby has fallen asleep. Occupant monitoring system 214 may also include one or more temperature sensors that monitor the temperature of the baby. When the temperature of the baby falls below a certain predetermined threshold, the method may declare that the baby has fallen asleep.

If the method determines that the baby has not fallen asleep, the method proceeds to 409, where it checks to see if a timeout condition has occurred, where a timeout condition is used to refer to a state where the vehicle has been driving along the driving route for longer than a predetermined amount of time. In some embodiments, the predetermined amount of time (or the time duration) may be set by a parent, guardian, babysitter, and the like. For example, one parent may want to set the time duration for a drive session to be for 10 minutes, while another parent at another time may want to set the time duration for a drive session to be for 15 minutes. The method may also limit the time duration that can be set to be below a certain preset value (for example 1 hour). The timeout condition may also occur if the driving route has been completed before the baby has fallen asleep. The timeout condition is essentially a time limit on the amount of time spent by the vehicle on the road. If a timeout condition is not detected, the method returns to 406, where the implementation of the drive session continues.

If a timeout condition is detected, the method continues to 410, where it provides a notification to the parent or supervisor of the baby that a timeout condition has occurred. At 412, the method returns back to a home location, which could be the home of the parent or supervisor of the baby. Finally, at 414, the method stores information about the driving route, where this information reflects the result that the selected driving route was unsuccessful in helping the baby fall asleep. In some embodiments, this information may be stored in data store 116. Returning back to 408, if the method determines that the baby has fallen asleep, then the method proceeds to 410, where it notifies the parent or supervisor of the baby that the baby has fallen asleep. (Note that this notification is different than the notification that would be provided if step 410 was reached from step 409, where a timeout condition is detected.) In some embodiments, where the vehicle is driven autonomously, the parent or supervisor of the baby may have also fallen asleep. This notification wakes the parent or supervisor when the baby is asleep. At 412, the vehicle returns to a home location, which could be the home of the parent or supervisor of the baby. Finally, at 414, the method stores information about the driving route, where this information reflects the result that the selected driving route was successful in helping the baby fall asleep. (Note that this information stored is different from the information stored if a timeout condition was reached.) In some embodiments, this information may be stored in data store 116.

In some embodiments, after a timeout condition has been detected and the vehicle is in the process of returning to a home location at 412, the method may still continue to monitor whether the baby has fallen asleep, similar to step 408. If, during the time period of the detection of a timeout condition and the time period where the vehicle returns to the home location, the baby does fall asleep, then the method may identify this as a driving route that was successful in helping the baby fall asleep at 414 and store information about the driving route accordingly in data store 116.

Figure 5:
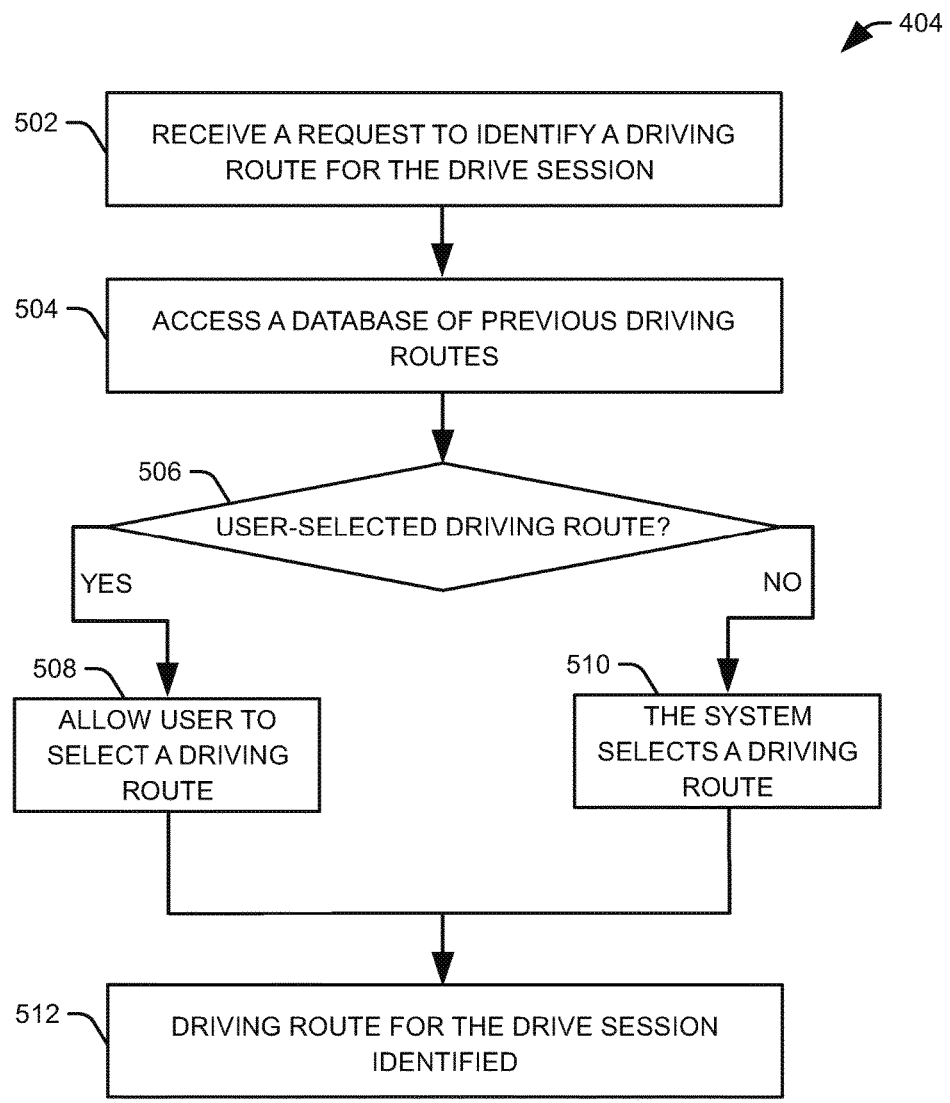
FIG. 5 illustrates an embodiment of a method for identifying a driving route for implementing a drive session.

FIG. 5 illustrates an embodiment of a method 404 for identifying a driving route for implementing a drive session. Initially, at 502, the method receives a request to identify a route for the drive session associated with the method described in FIG. 4. Next, at 504, the method accesses a database of previous driving routes. In some embodiments, the accessed database may be included in data store 116. Data accessed from the database may include the types of roads that are best suited to helping a baby fall asleep, and may also include previous drive routes that have been successful at helping the baby fall asleep. Other information that may be included in the data accessed from the database by the method 404 may include road topologies, road conditions, road smoothness, the number of stops associated with a driving route, the number of turns associated with a driving route, an approximate time or distance of the route, and the like.

At 506, the method checks to see whether the parent or supervisor of the child, herein referred to as a user, wishes to select the driving route. If the user wishes to select the driving route, the user is allowed to select the driving route at 508 via a suitable interface which may be, for example, via an application running on the user's mobile device or via the vehicle-driver interface in the vehicle. On the other hand, if the user does not wish to select the driving route, the method continues to 510, where the system automatically selects the driving route. In some embodiments, the automatic selection of the driving route could be based on road topology or a road network definition file (RNDF). As an example, suppose that the driving route has to be selected from one of four routes. The first few decisions regarding the selection of the driving route can be randomized if those four routes are equally good, and for each route selected and driven, the success of that route is recorded in data store 116. The method may record the duration of the drive session and whether the drive session was successful in helping the baby fall asleep, while including any timeout conditions that occur before the baby falls asleep. Over several driving trips, the average of the time taking for the baby to fall asleep is computed for each route, since the same route may take different periods of time to put the baby to sleep. Eventually, the route with the shortest average time should be selected as the driving route unless the live traffic data shows that route has a problem. The above selection procedure works best from a home location, where the one or more driving routes available for selection are encountered regularly and repeatably. There may be conditions where a new set of driving routes may present itself, such as when the family of the baby is on vacation, visiting relatives, or staying at a hotel. In this case, a heuristic could compare aspects of known good routes to local topology/routing to give a best match. The automatic selection process of a driving route may also be used, for example, to give suggestions to a parent in the case where a user is allowed to select a driving route 508. Once a driving route has been selected, the method proceeds to 512, where the driving route for the drive session is identified.

Figure 6:
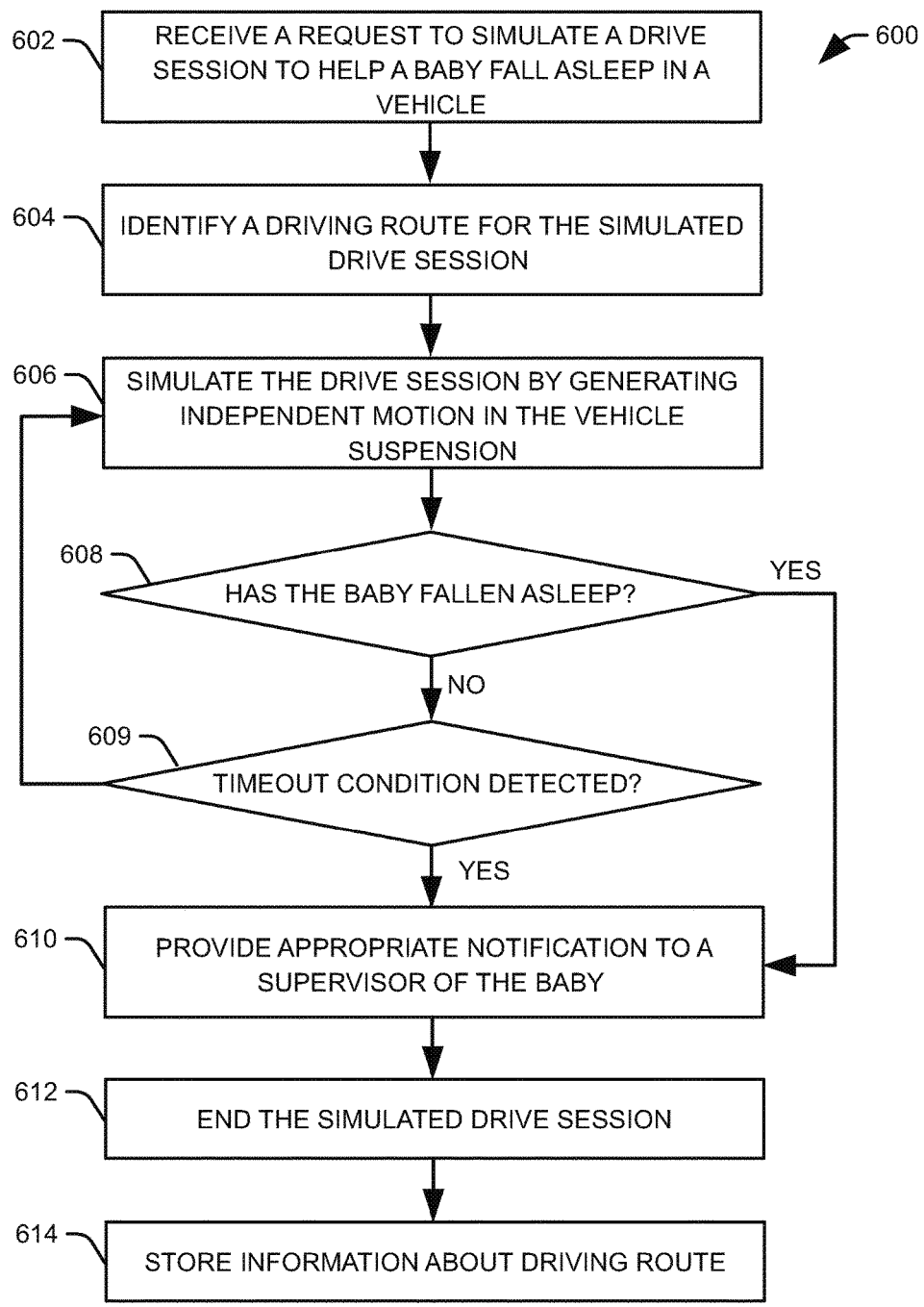
FIG. 6 illustrates an embodiment of a method for simulating a drive session to help a baby in the vehicle fall asleep.

FIG. 6 illustrates an embodiment of a method 600 for simulating a drive session to help a baby in the vehicle fall asleep. In some embodiments, method 600 may be implemented, at least in part, by ride control system 104. At 602, the method receives a request to simulate a drive session to help a baby fall asleep in a vehicle. In some embodiments, this request may be received from a parent or supervisor of the baby. At 604, the method identifies a driving route for the simulated drive session. Additional details regarding identifying a driving route for the simulated drive session are discussed herein, such as with respect to FIG. 7. Next at 606, the method simulates the drive session by generating independent motion in the vehicle suspension, where the baby may be placed in a standard infant or toddler seat in the vehicle. In some embodiments, the independent motion in the vehicle suspension may be generated using vehicle suspension controllers such as vehicle suspension controller 302, vehicle suspension controller 304, vehicle suspension controller 306 and vehicle suspension controller 308, where vehicle suspension controllers 302-308 are independently controlled by ride control system 104. The independent motion generated in the vehicle suspension is intended to simulate an actual ride in the vehicle, and may include at least one of the methods described earlier, such as independently expanding or contracting the vehicle suspension components for simulating vehicle acceleration or deceleration, simulating a bump in the road, simulating a banked curve in the road, simulating uneven or bumpy road conditions, and the like. In some embodiments, the method may also transmit, using the vehicle audio system (or other speakers 124), audio signals such as road noise and vehicle engine sounds. These audio signals along with the independent motion generated in the vehicle suspension provide a simulated drive session.

At 608 the method checks to determine whether the baby has fallen asleep. In some embodiments, the task of determining whether the baby has fallen asleep is performed by occupant monitoring system 214, where occupant monitoring system 214 may receive data (e.g., images) from one or more camera systems 110. As mentioned above, the system can detect that the baby has fallen asleep by using, for example, image processing functions that determine whether the baby's eyes are closed, or whether the baby has assumed a particular body posture, as described above. If the method determines that the baby has not fallen asleep, the method proceeds to 609, where it checks to see if a timeout condition has occurred, where a timeout condition is used to refer to a state where the time spent on the simulated driving route is greater than a predetermined amount of time. The timeout condition may also occur if the simulated driving route has been completed before the baby has fallen asleep. The timeout condition is essentially a time limit on the amount of time spent on the simulated driving route. If a timeout condition is not detected, the method returns to 606, where the simulation of the drive session continues.

If a timeout condition is detected, the method continues to 610, where it provides a notification to the parent or supervisor of the baby that a timeout condition has occurred. At 612, the method ends the simulated drive session. Finally, at 614, the method stores information about the simulated driving route, where this information reflects the result that the selected driving route was unsuccessful in helping the baby fall asleep. In some embodiments, this information may be stored in data store 116. Returning back to 608, if the method determines that the baby has fallen asleep, then the method proceeds to 610, where it notifies the parent or supervisor of the baby that the baby has fallen asleep. (Note that this notification is different than the notification that would be provided if step 610 was reached from step 609, where a timeout condition is detected.) At 612, the method ends the simulated drive session, and at 614, the method stores information about the driving route, where this information reflects the result that the selected driving route was successful in helping the baby fall asleep. (Note that this information stored is different from the information stored of a timeout condition was reached.) In some embodiments, this information may be stored in data store 116. In some embodiments, ending 612 the simulated drive session includes simulating driving a return route to the home to ensure that the baby stays asleep.

Figure 7:
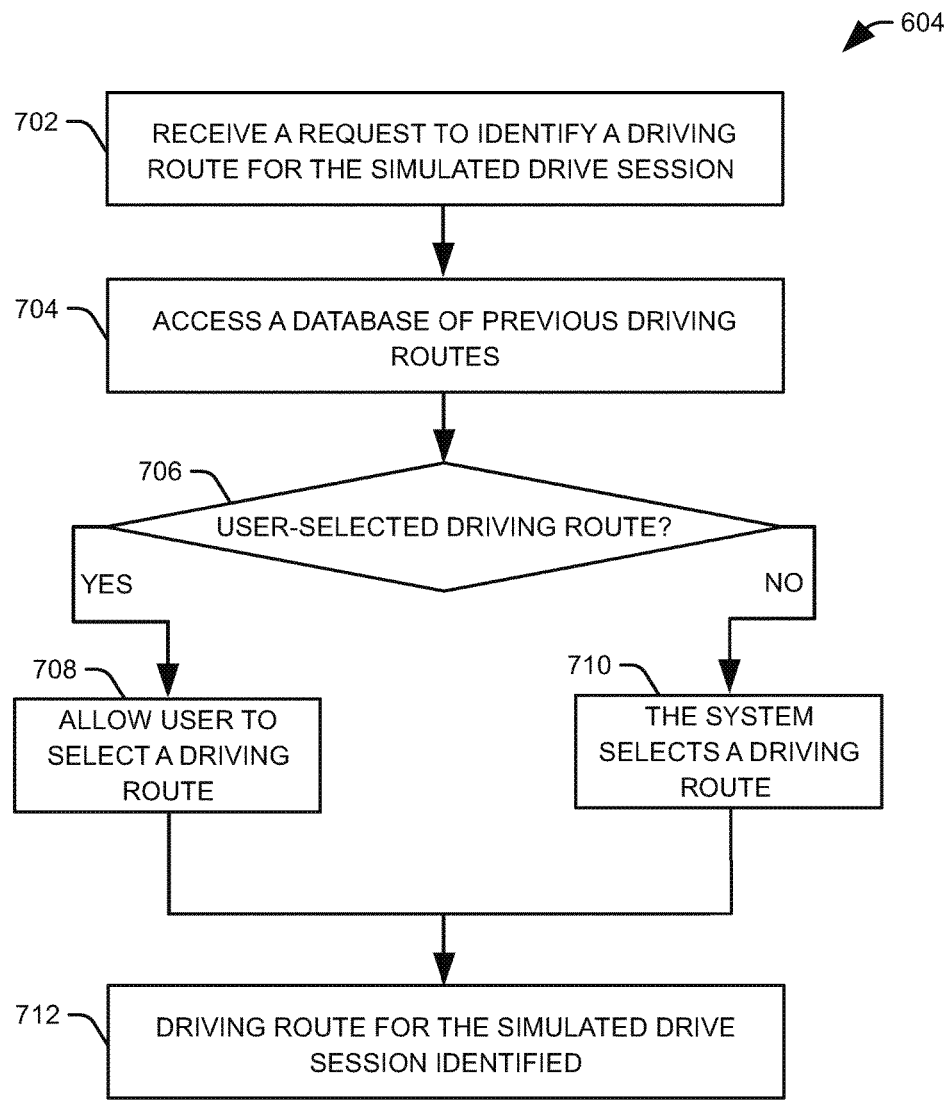
FIG. 7 illustrates an embodiment of a method for identifying a driving route for simulating a drive session.

FIG. 7 illustrates an embodiment of a method 604 for identifying a driving route for simulating a drive session. Initially, at 702, the method receives a request to identify a route for the simulated drive session associated with the method described in FIG. 6. Next, at 704, the method accesses a database of previous driving routes. In some embodiments, the accessed database may be included in data store 116. Data accessed from the database may include the types of roads that are best suited to helping a baby fall asleep, and may also include previous drive routes that have been successful at helping the baby fall asleep. Other information that may be included in the data accessed from the database by the method 604 may include road topologies, road conditions, road smoothness, the number of stops associated with a driving route, the number of turns associated with a driving route, an approximate time or distance of the route, and the like. At 706, the method checks to see whether the user wishes to select the driving route. If the user wishes to select the driving route, the user is allowed to select the driving route at 708 via a suitable interface which may be, for example, via an application running on the user's mobile device or via the vehicle-driver interface in the vehicle. On the other hand, if the user does not wish to select the driving route, the method continues to 710, where the system automatically selects the driving route. The method of automatically selecting a driving route is similar to, for example, that discussed above in the description of the method 404. Once a driving route has been selected, the method proceeds to 712, where the driving route for the simulated drive session is identified.

In some embodiments, rather than simulating a driving route, ride control system 104 may generate motion in the vehicle suspension such that the stationary vehicle rocks back and forth, from side to side, or in a combination of the two movements. This motion simulates a stay-in-place rocker that provides motion to help a baby in the vehicle fall asleep.

While various embodiments of the present disclosure are described herein, it should be understood that they are presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the described exemplary embodiments, but should be defined only in accordance with the following claims and their equivalents. The description herein is presented for the purposes of illustration and description. It is not intended to be exhaustive or to limit the disclosure to the precise form disclosed. Many modifications and variations are possible in light of the disclosed teaching. Further, it should be noted that any or all of the alternate implementations discussed herein may be used in any combination desired to form additional hybrid implementations of the disclosure.

The invention claimed is:

1. A method comprising:
   receiving, at a controller, a request to initiate a drive session to help a baby fall asleep in a vehicle;
   identifying, by the controller, a driving route for the drive session;
   simulating, by the controller, the drive session while maintaining the vehicle stationary, the simulating comprising by actuating a suspension of the vehicle effective to simulate all of rough road surfaces, acceleration, and deceleration; and
   determining, by one or more vehicle-mounted sensors, whether the baby in the vehicle has fallen asleep during the drive session.

2. The method of claim 1, wherein the driving route is selected from one or more previous driving routes that are associated with the baby falling asleep.

3. The method of claim 1, wherein the driving route is selected by a supervisor of the baby.

4. The method of claim 1, wherein the driving route is selected based on at least one of road smoothness, road topology, turns in the driving route, and stops in the driving route.

5. The method of claim 1, wherein the one or more vehicle-mounted sensors include a camera system.

6. The method of claim 1, further comprising providing, to a supervisor of the baby, a notification that the baby has fallen asleep.

7. A method comprising:
   receiving, at a controller, a request to simulate a drive session to help a baby fall asleep in a vehicle;
   identifying, by the controller, a driving route associated with the simulated drive session;
   simulating, by the controller, the drive session, wherein simulating the drive session includes generating independent motion in the suspension of the vehicle in accordance with the driving route while the vehicle is stationary, and wherein the independent motion in the suspension of the vehicle generates back-and-forth motion in the body of the vehicle; and
   determining, by one or more vehicle-mounted sensors, whether the baby in the vehicle has fallen asleep during the simulated drive session.

8. The method of claim 7, further comprising transmitting, via a vehicle audio system, an audio signal into the cabin of the vehicle, wherein the audio signal is comprised of at least one of vehicle engine sounds and road noise.

9. The method of claim 7, wherein the driving route is selected from one or more previous driving routes that are associated with the baby falling asleep.

10. The method of claim 7, wherein the driving route is selected by a supervisor of the baby.

11. The method of claim 7, wherein the one or more vehicle-mounted sensors include a camera system.

12. The method of claim 7, further comprising providing, to a supervisor of the baby, a notification that the baby has fallen asleep.

13. An apparatus comprising:
    a vehicle having four wheels and having an active suspension coupled to the four wheels;
    a computing system configured to receive a request to initiate a drive session to help a baby fall asleep in a vehicle, wherein the computing system is configured to identify a driving route for the drive session, and wherein the computing system is configured to implement first and second approaches, the first approach including implementing the drive session by simulating following the driving route while the vehicle is stationary by actuating the active suspension of the vehicle, the second approach including implementing the drive session by traversing the driving route; and
    a vehicle-mounted sensor coupled to the computing system and configured to determine whether the baby in the vehicle has fallen asleep during the drive session.

14. The apparatus of claim 13, wherein the driving route is selected from one or more previous driving routes that are associated with the baby falling asleep.

15. The apparatus of claim 13, wherein the driving route is selected by a supervisor of the baby.

16. The apparatus of claim 13, wherein the driving route is selected based on at least one of road smoothness, road topology, turns in the driving route, and stops in the driving route; and
    wherein actuating the vehicle suspension comprises simulating the road smoothness, the turns, and the stops in the driving route.

17. The apparatus of claim 13, wherein the vehicle-mounted sensor is a camera.

18. The apparatus of claim 13, wherein a supervisor of the baby is provided a notification that the baby has fallen asleep.

* * * * *